Figure 1:
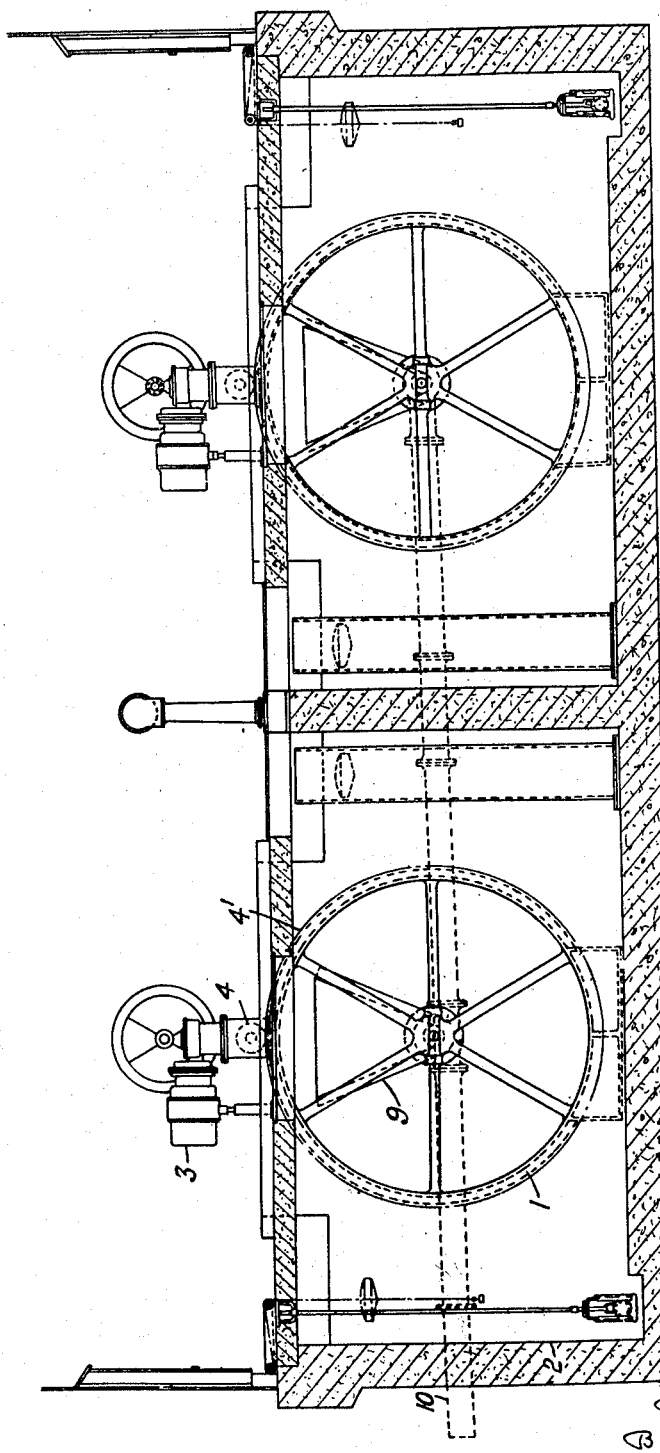

Feb. 22, 1949.   P. L. BOUCHER   2,462,604
WATER FILTER
Filed June 11, 1946   3 Sheets-Sheet 1

Feb. 22, 1949. P. L. BOUCHER 2,462,604
WATER FILTER
Filed June 11, 1946 3 Sheets-Sheet 2
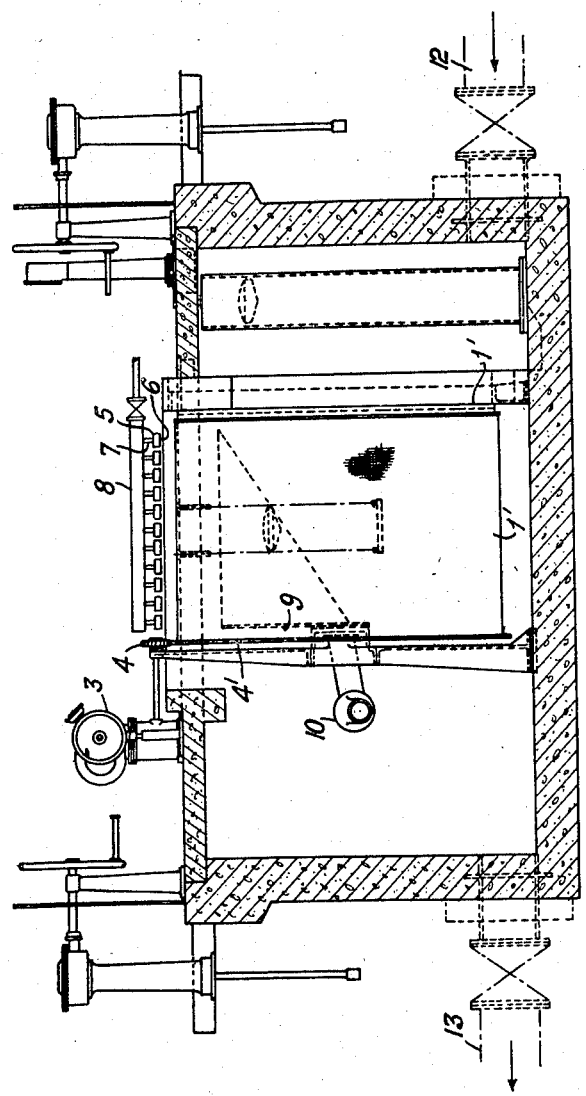
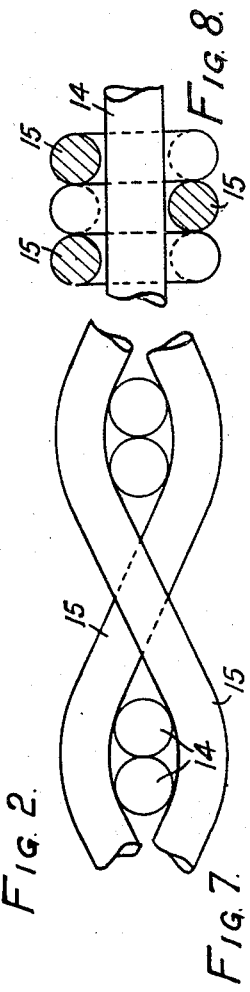

Feb. 22, 1949. P. L. BOUCHER 2,462,604
WATER FILTER
Filed June 11, 1946 3 Sheets-Sheet 3
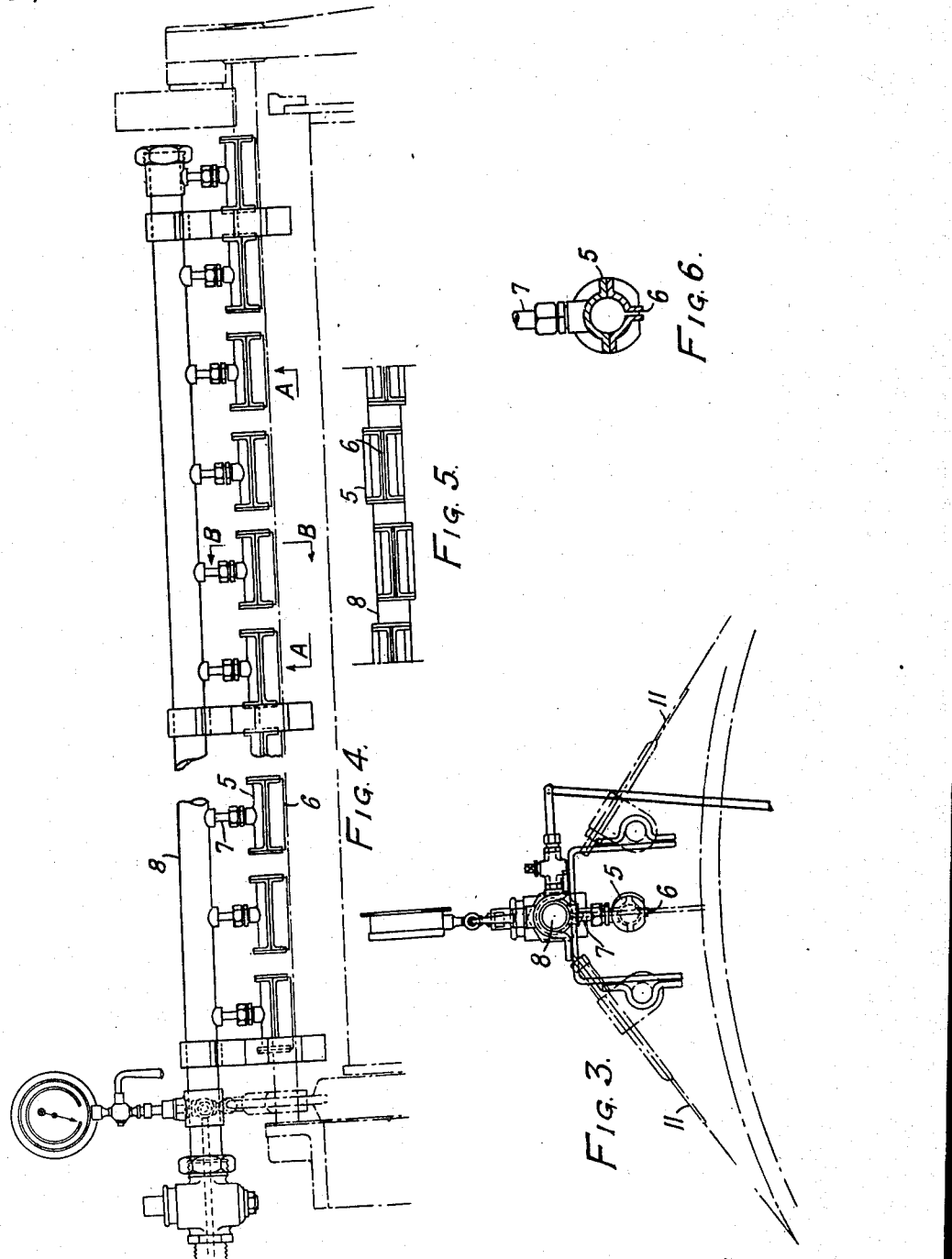

Patented Feb. 22, 1949

2,462,604

UNITED STATES PATENT OFFICE 2,462,604

WATER FILTER

Percival Lionel Boucher, Troon, Ayrshire, Scotland, assignor to Glenfield & Kennedy Limited, Kilmarnock, Ayrshire, Scotland, a corporation of Great Britain and Northern Ireland Application June 11, 1946, Serial No. 676,083
In Great Britain March 9, 1945

2 Claims. (Cl. 210—199)

The subject of this invention is an automatic self-cleaning filter or strainer incorporating a rotary drum the periphery of which is composed of stainless steel or other corrosion-resisting wire fabric, woven according to the so-called Dutch, corduroy or Hollander weave with straight warps and crimped wefts, the apertures of which are of the size of a few microns, preferably not more than ten microns. The warps may extend in the peripheral direction of the drum and the wefts may extend parallel to the axis, or vice versa.

For example, when the warps are in pairs, the number per inch of warps of 46 Imperial standard wire gauge may be 152 and the number of wefts of 47 Imperial standard wire gauge may be 525 per inch, to make a fabric filter screen having only 80,000 apertures per square inch.

With such a fine weave it is possible to arrest diatoms and other micro-organisms without the use of a filter aid while the strained or filtered water passes through the meshes of the fabric. Such a fine filter was not heretofore obtainable in conjunction with flexibility of the wire fabric.

The apertures of the fabric screen are of approximately triangular shape with ogee curved sides located on a surface of three dimensions. The aperture size may be defined as the diameter of the largest sphere that will pass therethrough, which in the fabric as woven is approximately 38 microns.

A smaller aperture size may be obtained by flattening the wires after weaving as by passing the fabric between rollers in which event the aperture size is reduced to 10 or less microns; or the warps and/or the wefts may be initially of elongated cross-section to give the same effect.

In practice, the water to be filtered is led to the interior of the rotary drum and the strained or filtered water passes through the meshes of the fabric to the exterior; the fabric being at the same time automatically and continuously cleaned by water jets directed against the exterior of the peripheral wall of the drum, normal to the surface of the band, in either case through the meshes of the fabric as previously described with similar cleaning arrangements to those provided for the rotary drum.

A practical embodiment of the invention is illustrated in the accompanying drawings in which Figs. 1 and 2 are sectional views of a water filter installation, Figs. 3 and 4 show the jet installation, Fig. 5 is a view on A—A in Fig. 4, Fig. 6 is a section on B—B in Fig. 4 and Figs. 7 and 8 are enlarged detail views showing the weave of the wire fabric.

Referring to the drawings, 1 denotes a substantially cylindrical rotary drum having a peripheral wall in the form of a screen of fine wire mesh which may be built up in panels.

The drum 1 is rotatable about a horizontal axis within a compartment 2 of a conduit and is open at one end, the front end as seen in Fig. 1, for admission of water to the interior of the drum, the edge of the drum at the open end being arranged to run in a seal 1' to prevent unfiltered water by-passing the drum as in a standard filtering plant. The exit for water from the drum is by way of the fine mesh screen, whereby the water is subjected to a very high degree of filtration.

For rotating the drum 1 there is provided in the present case as shown in Fig. 2, an electric motor 3 operatively connected to the drum 1 in any suitable manner, as through a train of gearing including a rotary pinion 4 engaging a toothed ring 4' forming a component of the drum structure.

Disposed above the drum 1 approximately in a vertical plane containing the axis of the drum is a row of nozzles 5 each comprising a short horizontal tube closed at both ends and formed with a narrow longitudinal discharge slot at 6. The nozzles 5 are connected by short pipes 7 with a supply pipe 8 and are displaced alternately to a small extent on opposite sides of the vertical plane containing the axis of the drum 1, so that the water jets discharged through the slots 6 do not interfere with one another.

These high pressure water jets serve for cleaning the meshes of the screen in the rotation of the drum 1.

9 denotes a receptacle for debris in the form of a hopper positioned within the drum 1 directly below the nozzles 5, said receptacle being surrounded by the drum-like or cylindrical screen as shown. Leading from the hopper 9 is a debris pipe 10 one end of which is coaxial with the drum 1 and which provides an outflow from the hopper 9.

11 denotes adjustable splash plates pivoted one at each side of the row of nozzles 5.

12 denotes a valved entrance pipe for unfiltered water, and 13 a valved outlet pipe for the filtered water.

The Dutch weave of the wire mesh screen is shown clearly in Figs. 7 and 8, where 14 denotes straight warps arranged in pairs and embraced by crimped wefts 15. As shown in Fig. 7, the warps 14 are in linear contact with one another so that the free space between the wefts at each crossing of the warps is substantially reduced and the interstices of the screen are thereby reduced and made much smaller than would be the case if but a single warp were used at each crossing of the wefts.

In practice there may be provided at least two drums in parallel.

What is claimed is:

1. In an automatic self-cleaning water filter including a rotary drum mounted with its axis substantially horizontal, the periphery of the drum consisting essentially of a woven wire fabric screen, one end of the drum being open for water to flow thereinto, an improved water filter screen on said drum of corrosion-resisting woven wire fabric with straight warps and crimped wefts, the warps being arranged in groups with each wire of each group in linear contact with another wire of the group, whereby the size of the apertures of the wire fabric is reduced.

2. In an automatic self-cleaning water filter including a member mounted for rotation, said member comprising a corrosion-resisting woven wire fabric having straight warps and crimped wefts, the warps being arranged in groups with each wire of each group in linear contact with another wire of the group whereby the apertures of the fabric are reduced in size, means for rotating said member to cause a portion thereof to pass beneath a body of water to be filtered, and means for directing a stream of cleaning fluid against another part thereof.

PERCIVAL LIONEL BOUCHER.

REFERENCES CITED

The following references are of record in the file of this patent:

UNITED STATES PATENTS

| Number | Name | Date |
| --- | --- | --- |
| 932,219 | Windschild | Aug. 24, 1909 |
| 1,557,117 | Sweeney | Oct. 13, 1925 |
| 1,726,608 | Brackett | Sept. 3, 1929 |
| 2,076,935 | Burckhalter | Apr. 13, 1937 |
| 2,370,315 | Jones et al. | Feb. 27, 1945 |

FOREIGN PATENTS

| Number | Country | Date |
| --- | --- | --- |
| 588,885 | Great Britain | June 5, 1947 |

OTHER REFERENCES

"Monel," Bulletin "H-3," page 687, September 20, 1940.